Feb. 21, 1967 HANS-DIETER SCHNEIDER 3,305,750
CIRCUIT FOR PROVIDING COINCIDENCE OF COLOUR TELEVISION PICH-UP TUBE RASTERS
Filed Sept. 27, 1963
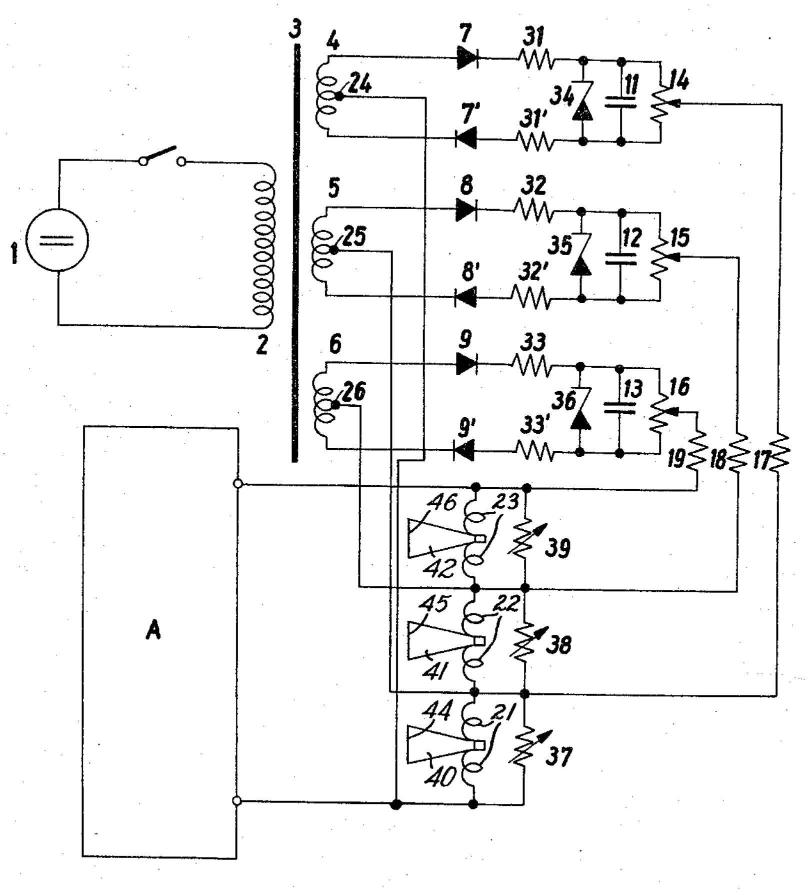
*Inventor:*
Hans-Dieter Schneider
by
Michael S. Striker
Attorney United States Patent Office 3,305,750

Patented Feb. 21, 1967

3,305,750

CIRCUIT FOR PROVIDING COINCIDENCE OF COLOUR TELEVISION PICK-UP TUBE RASTERS

Hans-Dieter Schneider, Grossgerau, Germany, assignor to Fernseh G.m.b.H., Darmstadt, Germany Filed Sept. 27, 1963, Ser. No. 312,112

Claims priority, application Germany, Sept. 29, 1962, F 37,916

6 Claims. (Cl. 315—27)

The present invention relates to a deflection arrangement for television devices, wherein at least two electron beams each reproduce a scanned area and wherein the shifting of the scanned area is caused by a direct current flowing through the associated pair of deflecting coils.

It has proved desirable for television devices for the pick-up and the reproduction of pictures to provide means whereby the scanned area reproduced by the electron beams on the screen of the cathode ray tubes is shifted horizontally and vertically within certain limits in order to compensate for asymmetries of the electrode arrangement and the deflecting field. A device allowing to shift the scanned area is particularly important for devices containing several cathode ray systems, as it is necessary that the scanned areas reproduced by the different ray systems are brought into coincidence. For this purpose the deflecting current fed to the deflecting coils is superimposed by an additive direct current, the magnitude and direction of which is made adjustable.

It is an object of the present invention to provide a circuit arrangement, wherein the above mentioned disadvantages are overcome.

In a deflection arrangement for television devices, wherein at least two electron beams each reproduce a scanned area, according to a main feature of the invention the serially connected pairs of deflecting coils are fed from a deflecting device with constant deflecting current amplitude, whereas the direct currents required for shifting the scanned areas are generated by independent rectifying circuits consisting of secondary windings of a transformer, of rectifiers and of potentiometers, the rectifying circuits being fed from the primary side of the transformer in a known manner, by a voltage supply of high frequency, e.g., a chopper generator. According to another feature of the invention the individual pairs of deflecting coils are, on the one hand, connected via decoupling resistors to the corresponding neutral points of the secondary windings and, on the other hand, to the tapping points of the potentiometers.

The advantage of the arrangement according to the invention is implied in that, as only independent D.C. generators are provided for generating the current required for shifting the scanned areas for the whole of the pairs of deflecting coils, the shifting current supplied by the D.C. generators is adjustable in each pair of deflecting coils separately and independent of reactive effects on the other pairs of deflecting coils. Another advantage results from the series connection of the pairs of deflecting coils, as the adjustment of the output voltage of the feeding deflection generator influences the whole of the pairs of deflecting coils in an equal manner, so that amplitude differences cannot occur when the scanned areas are brought into coincidence. It is further of advantage to feed the pairs of deflecting coils with a current of constant deflection amplitude, because the reproduced scanned areas can thus, in a very simple way, be corrected in their magnitude for the adjustment to coincidence.

It is advisable to provide additional means for stabilization, preferably Zener diodes, which allow to make the adjustment of the position of the scanned area independent of variations of the voltages supplied.

The invention will now be further illustrated with reference to the drawing showing an example of the arrangement. The figure represents a deflection device for a colour television with several pick-up tubes, each of these tubes generating one colour component of the picture. Therein the part of the deflection device supplying the deflecting currents is, for the sake of clarity, shown as block scheme whereas the parts of the deflection device, in which the shifting currents are generated, are shown in detail.

In order to obtain the currents for the shifting of the scanned areas the voltage delivered by a D.C. voltage supply 1 is chopped in a converter and induced by way of the primary windings 2 of a transformer 3 to the secondary windings 4, 5, 6. As converter can be used, e.g., the horizontal sweep generator itself. The voltages of the secondary windings 4, 5, 6 are rectified by rectifiers 7, 7′, 8, 8′, 9, 9′. By means of condensers 11, 12, 13 the generated D.C. voltages are smoothed, so that there are obtained stable D.C. voltages at the potentiometers 14, 15, 16. The tapping points of the potentiometers are each connected via the decoupling resistors 17, 18, 19 with one end of the winding of the serially connected vertical pairs of deflecting coils 21, 22, 23 of the pick-up tubes 40, 41, 42 and 43, respectively, which produce the colour components red, blue, and green on the screens 44, 45 and 46, respectively. The neutral points 24, 25, 26 of the secondary windings 4, 5, 6 of the associated rectifying circuits are connected with the other end of the winding of the pairs of deflecting coils 21, 22, 23. By displacement of the tapping points of the potentiometers 14, 15, 16 the load-independent sawtooth shaped deflection current supplied by the vertical deflection generator A and fed to the deflecting coils can be superimposed by a direct current in one or the other direction, and thus it is possible to shift the scanned areas at will.

In order to suppress also variations of the voltages supplied by the converter there are provided for further stabilization of the D.C. voltages generated by the rectifier circuits resistors 31, 31′, 32, 32′, 33, 33′ serially connected with rectifiers 7, 7′, 8, 8′, 9, 9′ and Zener diodes 34, 35, 36 in parallel with the potentiometers 14, 15, 16.

For the variation of the amplitude of deflection in the individual pairs of deflecting coils 21, 22, 23 variable resistors 37, 38, 39 are provided. If, e.g., the deflecting current is to be varied in only one pair of the deflecting coils, there is no reaction on the rest of the pairs of deflecting coils, because the total deflection current of the arrangement remains constant.

The arrangement according to the invention can advantageously be applied in colour television devices. Preferably the rectifying circuits used for generating the shifting current for the vertical deflecting coils are fed from the horizontal deflection generator. In this case the secondary windings of the rectifying circuits are mounted on the horizontal deflection transformer. In order to bring the scanned areas into coincidence, firstly the amplitudes of deflection are adjusted by means of resistors 37, 38, 39 in parallel with the deflecting coils, and then the scanned areas are shifted into coincidence by means of potentiometers of the rectifying circuits.

What is claimed as new and desired to be secured by Letters Patent is:

1. In a television apparatus including at least two means for producing separate electron beams, and at least two screen means located in the paths of said electron beams, respectively, each of said means for producing separate electron beams including at least two pairs of deflection coils connected substantially in series for deflecting said electron beams, a magnetic deflection arrangement associated with said deflection coils and superimposing a direct current of variable magnitude and polarity on the deflecting current flowing in said pairs of deflection coils, so that the position of the areas scanned by said electron beams on said screen means can be varied in horizontal and vertical directions, said arrangement comprising transformer means having primary winding means and a plurality of secondary windings; an alternating voltage source connected to said primary winding means; and at least two voltage stabilizing means each connected to one of said pairs of deflection coils on the one hand, and to one of said secondary windings of said transformer means on the other hand, so that the scanned areas on said screen means of said television apparatus can be brought into coincidence.

2. A television apparatus according to claim 1, wherein each of said voltage stabilizing means comprises a rectifier connected in series with the secondary winding associated with said voltage stabilizing means; a condenser connected in parallel with said secondary winding, said secondary winding having a center tap connected to one end of the associated pair of deflection coils; and a potentiometer winding having a resistance winding and a sliding contact movable thereon, said resistance winding being connected in parallel with said secondary winding and said sliding contact beng connected to the other end of said associated pair of deflection coils.

3. A television apparatus according to claim 2, wherein the voltage stabilizing means includes a zener diode connected in parallel with said condenser and said potentiometer resistance winding.

4. A television apparatus according to claim 2, including a resistor connected in series with said sliding contact of said potentiometer.

5. A television apparatus according to claim 2, including a variable resistor connected in parallel with said pair of deflection coils.

6. A television apparatus according to claim 2, including a scaling resistor connected in series with said rectifier.

References Cited by the Examiner

UNITED STATES PATENTS 3,109,122 10/1963 Cornell ------------- 315—27

FOREIGN PATENTS 1,134,703 10/1963 Germany.

OTHER REFERENCES

Bukstein, Ed.: "The Backward Diode," in Radio-Electronics, p. 35, November 1958.

ROBERT L. GRIFFIN, *Primary Examiner.*

T. A. GALLAGHER, *Assistant Examiner.*